(12) United States Patent
Schuttenberg (10) Patent No.: US 11,086,777 B2
(45) Date of Patent: Aug. 10, 2021

(54) REPLACEMENT OF CACHE ENTRIES IN A SET-ASSOCIATIVE CACHE

(71) Applicant: Arm Limited, Cambridge (GB)

(72) Inventor: Kim Richard Schuttenberg, Gilbert, AZ (US)

(73) Assignee: Arm Limited, Cambridge (GB)

( * ) Notice: Subject to any disclaimer, the term of this patent is extended or adjusted under 35 U.S.C. 154(b) by 205 days.

(21) Appl. No.: 16/371,469

(22) Filed: Apr. 1, 2019

(65) Prior Publication Data

US 2020/0310969 A1 Oct. 1, 2020

(51) Int. Cl.
*G06F 12/08* (2016.01)
*G06F 12/0802* (2016.01)
*G06F 12/127* (2016.01)
*G06F 12/0864* (2016.01)

(52) U.S. Cl.
CPC ...... *G06F 12/0802* (2013.01); *G06F 12/0864* (2013.01); *G06F 12/127* (2013.01); *G06F 2212/60* (2013.01)

(58) Field of Classification Search
CPC .. G06F 12/121; G06F 12/0864; G06F 12/128; G06F 12/123; G06F 12/0802; G06F 12/127; G06F 2212/60; G06F 12/0893; G06F 12/1045
See application file for complete search history.

(56) References Cited

U.S. PATENT DOCUMENTS

| | | | | |
|---|---|---|---|---|
| 6,732,234 B1* | 5/2004 | Rowlands | ............ | G06F 12/0802 711/108 |
| 6,748,492 B1* | 6/2004 | Rowlands | ............. | G06F 12/121 711/128 |
| 6,801,883 B1* | 10/2004 | Hurlock | ................ | G06F 12/121 703/2 |
| 2003/0225976 A1* | 12/2003 | Hokenek | ............. | G06F 12/0842 711/133 |
| 2011/0010502 A1* | 1/2011 | Wang | .................... | G06F 12/128 711/128 |
| 2013/0297879 A1* | 11/2013 | Abali | .................. | G06F 12/0873 711/128 |

* cited by examiner

*Primary Examiner* — Ernest Unelus
(74) *Attorney, Agent, or Firm* — Nixon & Vanderhye P.C.

(57) ABSTRACT

An apparatus comprises a set-associative cache comprising a plurality of sets of cache entries, and cache replacement policy storage circuitry to store a plurality of local replacement policy entries. Each local replacement policy entry comprises local replacement policy information specific to a corresponding set of the set-associative cache. Cache control circuitry controls replacement of cache entries of the set-associative cache based on the local replacement policy information stored in the cache replacement policy storage circuitry. The cache replacement policy storage circuitry stores local replacement policy entries for a proper subset of sets of the set-associative cache.

18 Claims, 5 Drawing Sheets

REPLACEMENT OF CACHE ENTRIES IN A SET-ASSOCIATIVE CACHE

BACKGROUND

Technical Field

The present technique relates to the field of data processing. More particularly, it relates to cache replacement policy for a set-associative cache.

Technical Background

A data processing system may have a cache to store data from a larger data store, which can provide faster access to data from a subset of addresses of the data store. When a data access request for a given address misses in the cache, a cache replacement policy may be used to control which cache entry is replaced with a newly allocated entry for the requested address.

SUMMARY

At least some examples provide an apparatus comprising: a set-associative cache comprising a plurality of sets of cache entries; cache replacement policy storage circuitry to store a plurality of local replacement policy entries, each local replacement policy entry comprising local replacement policy information specific to a corresponding set of the set-associative cache; and cache control circuitry to control replacement of cache entries of the set-associative cache based on the local replacement policy information stored in the cache replacement policy storage circuitry; in which: the cache replacement policy storage circuitry is configured to store local replacement policy entries for a proper subset of sets of the set-associative cache.

At least some examples provide an apparatus comprising: means for set-associative caching, comprising a plurality of sets of cache entries; means for storing a plurality of local replacement policy entries, each local replacement policy entry comprising local replacement policy information specific to a corresponding set of the means for set-associative caching; and means for controlling replacement of cache entries of the means for set-associative caching based on the local replacement policy information stored in the means for storing; in which: the means for storing is configured to store local replacement policy entries for a proper subset of sets of the means for set-associative caching.

At least some examples provide a method comprising: storing data in a set-associative cache comprising a plurality of sets of cache entries; and controlling replacement of cache entries of the set-associative cache based on local replacement policy information stored in cache replacement policy storage circuitry configured to store a plurality of local replacement policy entries, each local replacement policy entry comprising local replacement policy information specific to a corresponding set of the set-associative cache; in which: the cache replacement policy storage circuitry is configured to store local replacement policy entries for a proper subset of sets of the set-associative cache.

Further aspects, features and advantages of the present technique will be apparent from the following description of examples, which is to be read in conjunction with the accompanying drawings.

DESCRIPTION OF EXAMPLES

A set-associative cache comprises a number of sets of cache entries. Each set comprises two or more cache entries. Each individual cache entry in one set may be called a way. Hence, an N-way set-associative cache is a cache where each set includes N entries, where N is the associativity of the cache.

In a set-associative cache, when a cache access is requested, the address of the requested information is used to select one of the sets, and it is determined whether any of that set of cache entries stores the information having the requested address. If the address hits in the indexed set, then data may be read from, or written to, the matching cache entry. However, if there is a miss in the indexed set then a cache entry may be allocated for storing the information associated with the requested address, and there may be a choice of which of the cache entries in the set should be selected for the allocation. If there are no invalid entries available, then previously allocated information may need to be evicted from a victim entry of the indexed set of cache entries. Replacement policy information can be used to select which cache entry of the set is the victim entry.

One approach for managing cache replacement policy is to provide local replacement policy information for each individual set of the set-associative cache, with each local replacement policy entry being specific to that particular set and not being shared with other sets. For example, each local replacement policy entry may be updated in response to accesses or allocations to the corresponding set. This information could be used to attempt to predict which entry in the set is least likely to be used again in the near future, and so is the best candidate for being replaced with an entry for a different address. However, maintaining such local replacement policy for every set of the set-associative cache can be expensive in hardware. A more area-efficient approach can be to provide shared replacement policy information which is shared by each of the sets of the cache, but in this case there is a performance cost because the shared replacement policy information is less accurate. For example, the sharing of replacement policy information could mean that the same way in a given set is selected for a number of consecutive allocations, and other ways of that set are not used, which can make the cache more prone to cache thrashing (poor cache hit rate caused by access requests to different addresses mapping to the same set evicting each other's data before a second request to the same address as a previous request can be serviced).

In the techniques discussed below, the set-associative cache is associated with cache replacement policy storage circuitry which stores a number of local replacement policy entries, each for storing local replacement policy information specific to a corresponding set of the set-associative cache. The cache replacement policy storage circuitry stores local replacement policy entries for a proper subset of sets of the set-associative cache. Hence, at least one set of the set-associative cache is not part of the proper subset and does not have a corresponding local replacement policy entry. As there are still some local replacement policy entries maintained specific to individual sets of the set-associative cache, this can reduce cache thrashing by allowing smarter decisions on replacement for critical cache lines, but the storage overhead associated with maintaining the replacement policy information is lower because only some of the sets of the set-associative cache have local replacement policy information provided. This allows a better balance between performance and circuit area cost.

A storage capacity of the cache replacement policy storage circuitry may be insufficient to store local replacement policy entries for all of the sets of the set-associative cache. The number of local replacement policy entries supported in hardware may be less than the number of sets in the set-associative cache. The proper subset of sets may exclude a remaining subset of sets of the set-associative cache.

When a cache miss occurs in a given set of the set-associative cache, and allocation of data to the given set requires a victim cache entry of the given set to be evicted, cache control circuitry may determine whether the given set is one of the proper subset of sets. When the given set is one of the proper subset of sets, the cache control circuitry may select the victim cache entry based on the local replacement policy information stored in a corresponding local replacement policy entry of the cache replacement policy storage circuitry.

On the other hand, when the given set is one of the remaining subset of sets of the set-associative cache (the given set is not in the proper subset), the cache control circuitry may select the victim cache entry based on a shared cache replacement policy which is shared between the remaining subset of sets. Hence, while for some of the sets specific local replacement policy information is maintained per set, for other sets the cache control circuitry may fall back on using a shared cache replacement policy which is not based on information maintained specific to one particular set.

In some examples the shared cache replacement policy can be implemented without needing to store any policy information at all. For example, the shared cache replacement policy could be a random replacement policy, in which one of the given set of cache entries is selected based on a random or pseudorandom number.

However, for other implementations the shared cache replacement policy may select the victim cache entry based on shared replacement policy information stored by the cache replacement policy storage circuitry. This can allow a more informed decision on which entry to select for replacement, which can help to improve performance compared to a random replacement policy. As the shared replacement policy information is shared between a number of sets of the cache, it does not incur a significant amount of storage overhead in hardware.

In response to a cache hit or allocation of a new entry in a given set of the set-associative cache, the cache control circuitry may determine whether the given set is one of the proper subset of sets for which the local replacement policy entries are provided. When the given set is one of the proper subset of sets, the local replacement policy information in a corresponding local replacement policy entry may be updated. When the given set is one of the remaining subset of sets, the shared cache replacement policy information may be updated. It is not essential to update the local and shared cache replacement policy information in all implementations. For example if the shared cache replacement policy is a random selection then there is no shared cache replacement policy information to update. Also, in some cases, depending on the replacement policy used, updates of the replacement policy information could be performed on cache hits but not on cache allocations, or vice versa (updating the replacement policy information on allocations of new entries, but not on a cache hit). Other approaches may choose to update the replacement policy (local or shared) on both a cache hit and an allocation of a new entry.

The shared replacement policy could be one of a random replacement policy, a round-robin replacement policy, a least recently used (LRU) replacement policy and a not-recently-used (NRU) replacement policy.

Also, the local replacement policy could be one of a round-robin replacement policy, a LRU replacement policy and a NRU replacement policy. The local replacement policy may be different to the shared replacement policy.

A round-robin replacement policy is one which alternates which way is selected as the victim entry, according to a predetermined sequence. For example, in a 4-way set-associative cache, the four ways A, B, C, D could be selected in order A, B, C, D, A, B, C, D, A, etc. Hence, for the round-robin replacement policy the (local or shared) replacement policy information could specify an identifier indicating the next way to select (or the previous way selected for allocation), or any other indication which allows the current position in the round-robin sequence to be identified.

A least recently used (LRU) replacement policy is one which selects for allocation the way which is indicated by tracking information as being least recently used. For example, the (local or shared) replacement policy information could comprise a group of counters, one counter per way. Each time a way is accessed, the counter for that way is reset to zero, and the counters for the other ways are incremented. When allocating to the cache, the way having the greatest value of counter is selected for eviction. This could be used either for the local replacement policy or the shared replacement policy, or both.

A not-recently-used (NRU) replacement policy may be cheaper to implement than an LRU replacement policy, in that the replacement policy information may comprise a one-bit flag for each cache way, and at periodic intervals, all the flags may be reset to 0. When a given way is accessed, the corresponding flag is set to 1. On a cache eviction, a way which still has the flag set to 0 is selected, which may not necessarily be the least recently used, but is a way which has not been accessed since the last reset of the NRU flags. Again, this approach could be used for either the local replacement policy entries, or the shared replacement policy information, or both.

In some implementations, the proper subset of sets may be fixed in hardware, so that certain sets of the cache may permanently be allocated to the proper subset and other sets may permanently be allocated to the remaining subset.

However, in other implementations the cache control circuitry may vary which sets of the set-associative cache are in the proper subset of sets. This can be useful because typically it may depend on the particular software workload being processed which sets of the set-associative cache will provide the greatest performance benefit from having dedicated local replacement policy.

In one example, the local replacement policy entries of the cache replacement policy storage circuitry may act as a further cache of the history of sets in the set-associative cache. The local replacement policy entries may be managed with associativity, for example allocation of sets to the local replacement policy entries may be controlled based on a set-associative or fully-associative cache placement policy.

Also, the cache control circuitry may implement a further replacement policy for controlling the replacement of local replacement policy entries in the cache replacement policy storage circuitry. Hence, selection of a victim local replacement policy entry to be overwritten with replacement policy information for a different set of the set-associative cache may be controlled by the cache control circuitry based on a replacement-policy-entry (RPE) replacement policy.

In some cases, the RPE replacement policy may comprise a random replacement policy, which does not require storage of specific tracking information, as the selection of a victim local replacement policy entry can be based on a random or pseudorandom number provided by a random number generator or pseudorandom number generator.

Alternatively, the RPE replacement policy may be based on RPE replacement policy information. Again, the RPE replacement policy could be one of a round-robin replacement policy, an LRU replacement policy and an NRU replacement policy. Other replacement policies are also possible. When choosing which particular sets should be in the proper subset of sets for which the local replacement policy information is cached in the replacement policy storage circuitry, various heuristics can be used, such as tracking which sets were recently filled (allocated), which sets were recently accessed on cache hits, or which sets have experienced thrashing (e.g. based on a metric tracking the frequency of re-allocations in a particular set).

Each local replacement policy entry may include a tag portion identifying the corresponding set of the set-associative cache. On a cache miss, in a given set, the cache control circuitry may look up the tag portions of each local replacement policy entry to determine whether the set is one of the proper subset of sets for which a local replacement policy entry should be used to select a victim entry, or is one of the remaining subset of sets which may use a shared replacement policy.

Figure 1:
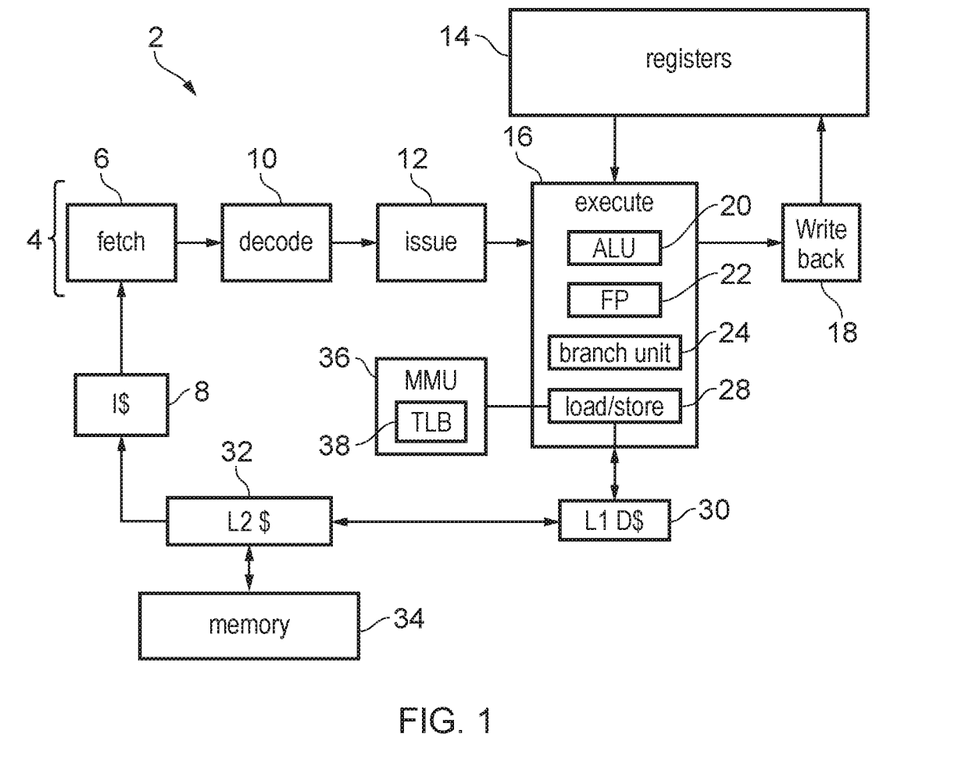
FIG. 1 schematically illustrates an example of a data processing system having at least one cache.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetch program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from a scalar register file 21; a floating point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. A memory management unit (MMU) 36 controls address translations between virtual addresses specified by load/store requests from the load/store unit 28 and physical addresses identifying locations in the memory system, based on address mappings defined in a page table structure stored in the memory system. The page table structure may also define memory attributes which may specify access permissions for accessing the corresponding pages of the address space, e.g. specifying whether regions of the address space are read only or readable/writable, specifying which privilege levels are allowed to access the region, and/or specifying other properties which govern how the corresponding region of the address space can be accessed. Entries from the page table structure may be cached in a translation lookaside buffer (TLB) 38 which is a cache maintained by the MMU 36 for caching page table entries or other information for speeding up access to page table entries from the page table structure shown in memory.

In this example, the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

Figure 2:
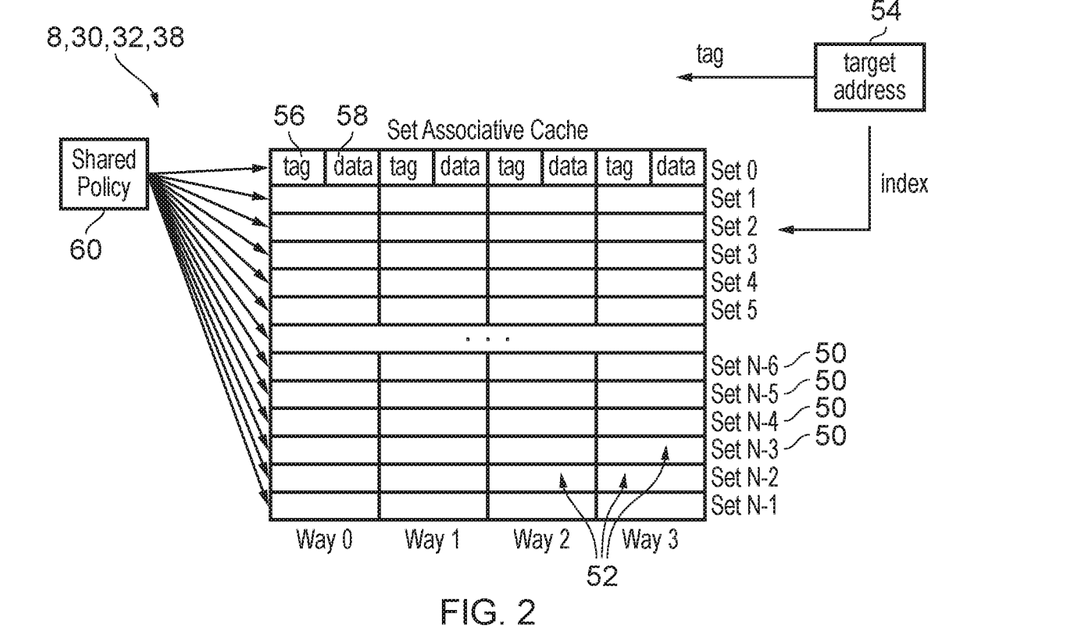
FIG. 2 shows, for comparison, a set-associative cache in which a shared replacement policy is used for all sets of the cache.

Hence, the data processing system 2 shown in FIG. 1 may have a number of caches, such as the instruction cache 8, level one data cache 30, level two cache 32 and the TLB 38. Other forms of cache could also be provided. Such caches may be implemented as a set-associative cache. As shown in FIG. 2, a set-associative cache comprises a number of sets 50 of cache entries 52, each set 50 having two or more entries 52. For a cache having associativity A, this means that the number of entries in one set 50 is A. Such a cache can be described as A-way set-associative cache. The set-associative placement policy used for such a cache means that when data having a given address 54 needs to be allocated into the cache, it can only be placed in one of the entries 52 within a particular set 50 that is selected based on an index value computed based on the target address 54. In some cases the index value may simply be a portion of bits extracted from the target address 54, while in other examples the index could be based on a more complicated function of the target address 54. Hence, data associated with a given address 54 cannot be stored in other sets other than the set corresponding to the index selected based on the target address 54. This is useful because it reduces the number of entries of the cache which have to be checked to determine whether the cache stores data associated with the target address, but in comparison to a direct-mapped cache, the set-associative placement scheme improves performance as there is flexibility to allocate data for a given address to two or more locations, which reduces the likelihood of thrashing as it means two or more different addresses mapping to the same set can each be cached simultaneously.

Each entry 52 may specify a cache tag value 56 and a data value 58. The data value 58 is the information of interest which is stored in the corresponding cache entry 52. In this context, the data value 58 could be data or instructions, or could be address mapping information cached in the TLB 38 for example. The tag 56 corresponds to a portion of the target address 54 which is not used to generate the index, and is stored alongside the cached data 58 to allow the different addresses which map to the same index to be distinguished from each other when looking up in the cache.

Hence, on a cache access, the index part of the target address is used to select a set and each of the tag values 56 in the entries 52 within the selected set are compared with the tag portion of the target address 54. If any of the read tag values 56 match the tag portion of the target address then the corresponding cache entry 52 having the matching tag 56 stores the data for the requested target address 54, and that entry can be read or written depending on the type of memory access being performed. The scenario when one of the tags 56 in the indexed set 50 matches the tag of the target address is called a cache hit.

On the other hand, if none of the tags 56 in the indexed set 50 match the tag of the target address 54, then this is known as a cache miss, and in this case the information associated with the target address may need to be fetched from a further data store, such a as a further level of cache 32 or main memory 34. If one of the indexed set of caches is invalid, then the invalid entry can be selected for allocating the new data associated with a target address 54. However, if all of the index set of entries are already filled with valid data then a decision needs to be made as to which of the indexed set 50 should be selected as a victim entry which is to be evicted from the cache to make way for the new information associated with the target address 54.

In the example shown in FIG. 2, a shared cache replacement policy 60 is applied to all of the sets 50 of the cache. In some examples, if there is a miss in a given set 50, then the victim entry could be selected based on a random or pseudorandom number. Such a policy may tend to distribute cache allocations across the different ways within one set. A more refined approach can be to store shared policy information which is updated based on recent cache accesses or allocations. For example, the shared policy information could track which way was least recently accessed in the cache as a whole and then on a cache miss in a given set 50, the entry 52 in the least recently accessed way could be accessed. However, as the shared policy information 60 is shared between each of the cache sets 50, this may not be able to prevent cache thrashing (when a series of cache accesses repeatedly evict data from one address to make way for another and then evict the newly allocated address to return to caching the first address again). For example, if the shared policy information was round robin information, which alternates which way is selected for eviction, there could be a certain series of cache allocations where, for example, way 0 is selected for allocating an address mapping to set zero, then ways 1, 2 and 3 are selected when making allocations for other sets 50 of the cache other than set 0, and then when the next allocation is made into set 0 again, the round robin indication indicates that way 0 should be selected, even though there have been no allocations into any of ways 1, 2 and 3 in set 0. This means that data most recently allocated into set 0 may be evicted from the cache while data less recently allocated in one of ways 1, 2 or 3 may persist, which may not be the most efficient usage of the cache storage capacity for some workloads.

Figure 3:
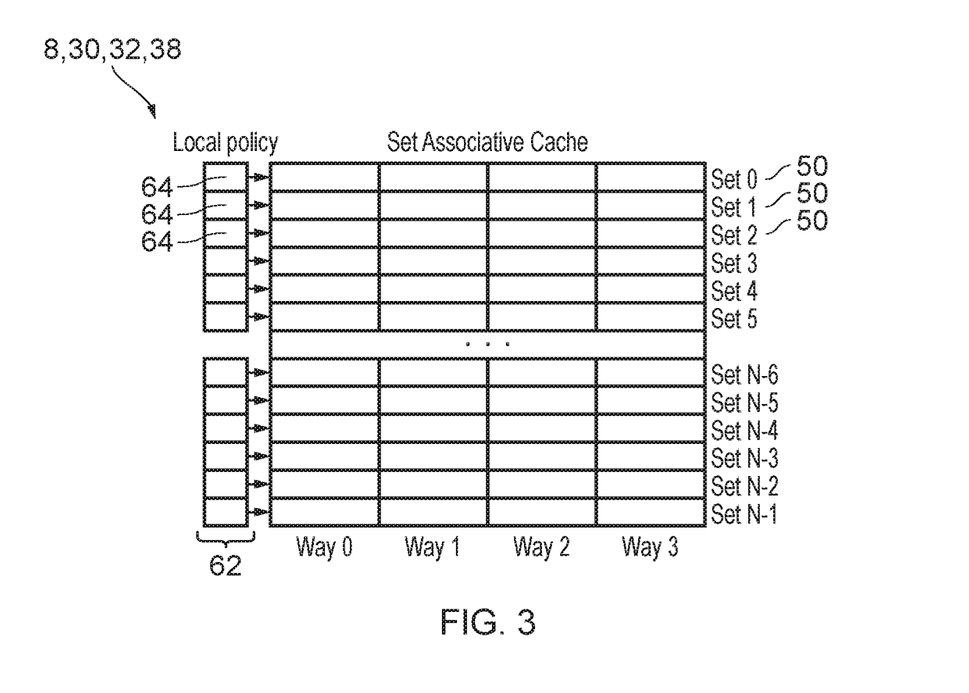
FIG. 3 shows, for comparison, a set-associative cache in which local replacement policy specific to an individual set is used for each of the sets of the cache.

As shown in FIG. 3, performance can be improved by providing local policy storage circuitry 62 which stores, separately for each set 50 of the cache, local policy storage information. Each set 50 has a corresponding local policy information entry 64 which can be updated according to a round robin, NRU, LRU or other replacement policy. In this approach, when there is a miss in a given set 50 of the cache, then the corresponding local replacement policy entry 64 is used to select which of the ways of that set 50 should be selected as the victim entry to be evicted to make way for other information. This approach can be better for performance as it can reduce the likelihood of cache thrashing. However, it can be very expensive in hardware to maintain a separate local replacement policy entry 64 for every set 50. For example a typical set-associative cache may comprise 256 or 512 sets, and so in practice this means that maintaining a local replacement policy entry 64 for each set may require so much storage of state data that it is necessary for the local replacement policy storage circuitry 62 to be implemented using SRAM (static random access memory), which may require a certain amount of control logic for controlling addressing into the SRAM array and for handling a sufficient bandwidth of reads and writes. For relatively low-power processing systems for which energy efficiency and low circuit area costs may be a more important criterion than processing performance, such local replacement policy information storage 62 may not be justified and so such systems may normally use a shared policy 60 as in FIG. 2, but this may reduce performance.

Figure 4:
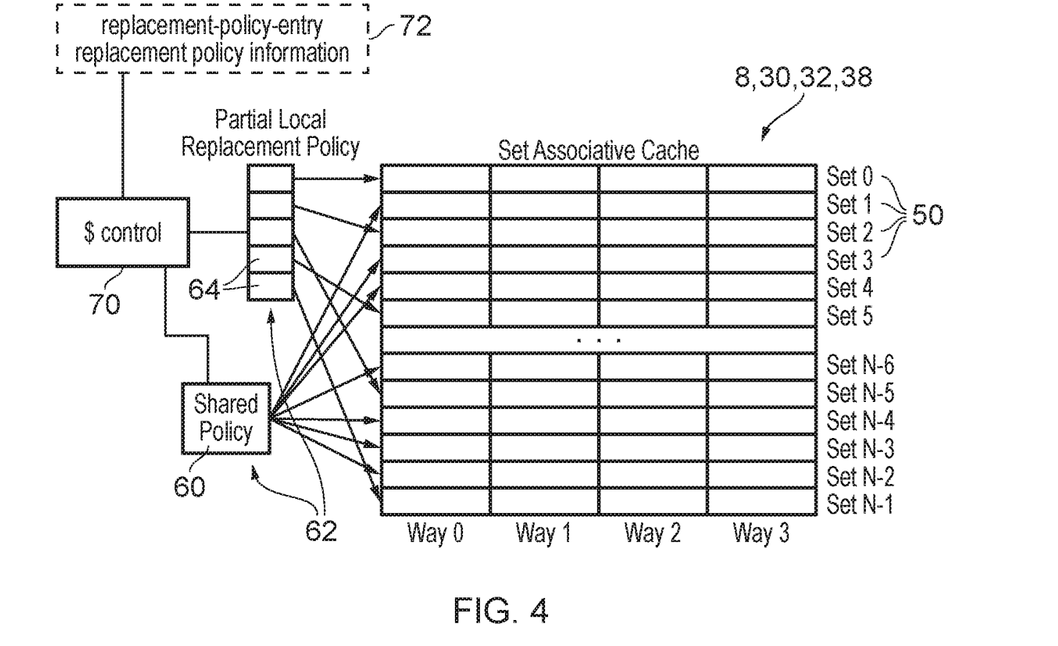
FIG. 4 shows an approach in which local replacement policy information is provided for a proper subset of sets of the cache, while shared replacement policy is used for remaining sets.

As shown in FIG. 4, these issues can be addressed by providing a partial local replacement policy scheme in which the local replacement policy entries 64 are only provided for a proper subset of sets 50 of the cache and the remaining subset of sets does not have individual replacement policy entries 64, but instead has its replacement control based on a shared replacement policy 60. In the particular instance shown in FIG. 4, the proper subset of sets includes sets 0, 2, 5, N−5 and N−1, and all other sets are in the remaining subset of sets, but as described below the membership of the proper subset and remaining subset may change over time.

The shared replacement policy 60 could be a random replacement policy which is not based on any stored tracking state, or could be a policy such as round robin or NRU which may be stored based on states tracking accesses to the cache. The local replacement policy for each individual entry 64 can also be a round robin, LRU or NRU policy.

Cache control circuitry 70 is provided to manage accesses to the cache and to control which sets 50 have corresponding local replacement policy entries 64 allocated within the replacement policy storage 62. The cache control circuitry 70 can vary which steps 50 are allocated within the local replacement policy storage 64, and control the selection of sets 50 based on a replacement policy entry replacement policy, which could be random, LRU, NRU, round robin etc. In some examples the replacement of replacement policy entry 64 may be based on replacement policy-entry (RPE) replacement policy information 72 which may be maintained in a further storage element by the cache control circuitry 70.

Figure 5:
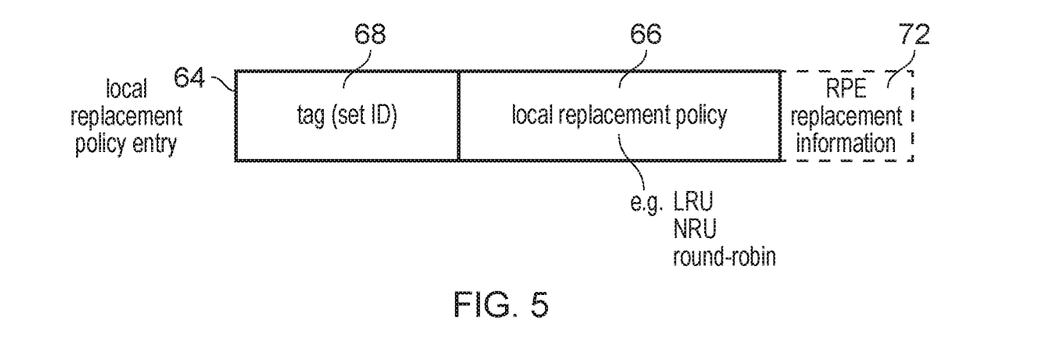
FIG. 5 shows an example of a local replacement policy entry.

As shown in FIG. 5, each local replacement policy entry 64 may include, in addition to the local replacement policy tracking information 66 itself, a tag portion 68 which identifies which set 50 of the set-associative cache is the corresponding set for the local replacement policy entry. This can be looked up when there is a cache miss for a given set 50 of the cache 8, 30, 32, 38 to determine whether the set 50 which encountered the cache miss is one of the proper subset of sets which has a corresponding local replacement policy entry 64 allocated, or is one of the remaining subset of sets for which the shared policy 60 should be applied. Optionally, the local replacement policy information could also include the corresponding RPE replacement information 72, although this could also be maintained within a separate structure if desired, or if a random replacement is used for replacing the local replacement policy entry 64 then no RPE replacement information 72 is needed.

Hence, with this approach the storage overhead for the replacement policy storage 72 can be much lower since fewer entries have dedicated local replacement policy entries 64. However, this approach can still provide a relatively significant improvement in performance for certain software workloads. It is recognised that in practice, most software workloads do not experience a significant amount of cache thrashing in every set 50 of the cache, and there may only be some sets for which cache thrashing occurs, as this will depend on the relative frequency of accesses to different addresses mapping to the same set. Hence, in practice maintaining separate local replacement policy entries 64 for every set in the cache can unnecessarily consume a large amount of storage circuitry, which may not always be fully used. By providing local replacement policy information only for a subset of cache sets (the subset of sets can be selected based on which sets 50 are most likely to experience thrashing, as determined based on previous attempts at executing the workload), this can still improve performance while the storage requirements for the replacement policy information are much reduced.

Another advantage of reducing the number of sets 50 for which local replacement policy entries are provided is that this can make it feasible to implement the partial local replacement policy in flip-flops, rather than SRAM. Flip-flops can be faster to read and update and require less circuit area, so that read-modify-write operations on the stored replacement history are not as expensive as they would be for a local replacement policy storage which covered all of the sets 50 of the cache. This can make it faster to dynamically update replacement policy information based on decided replacement decisions or tracked cache accesses.

Figure 6:
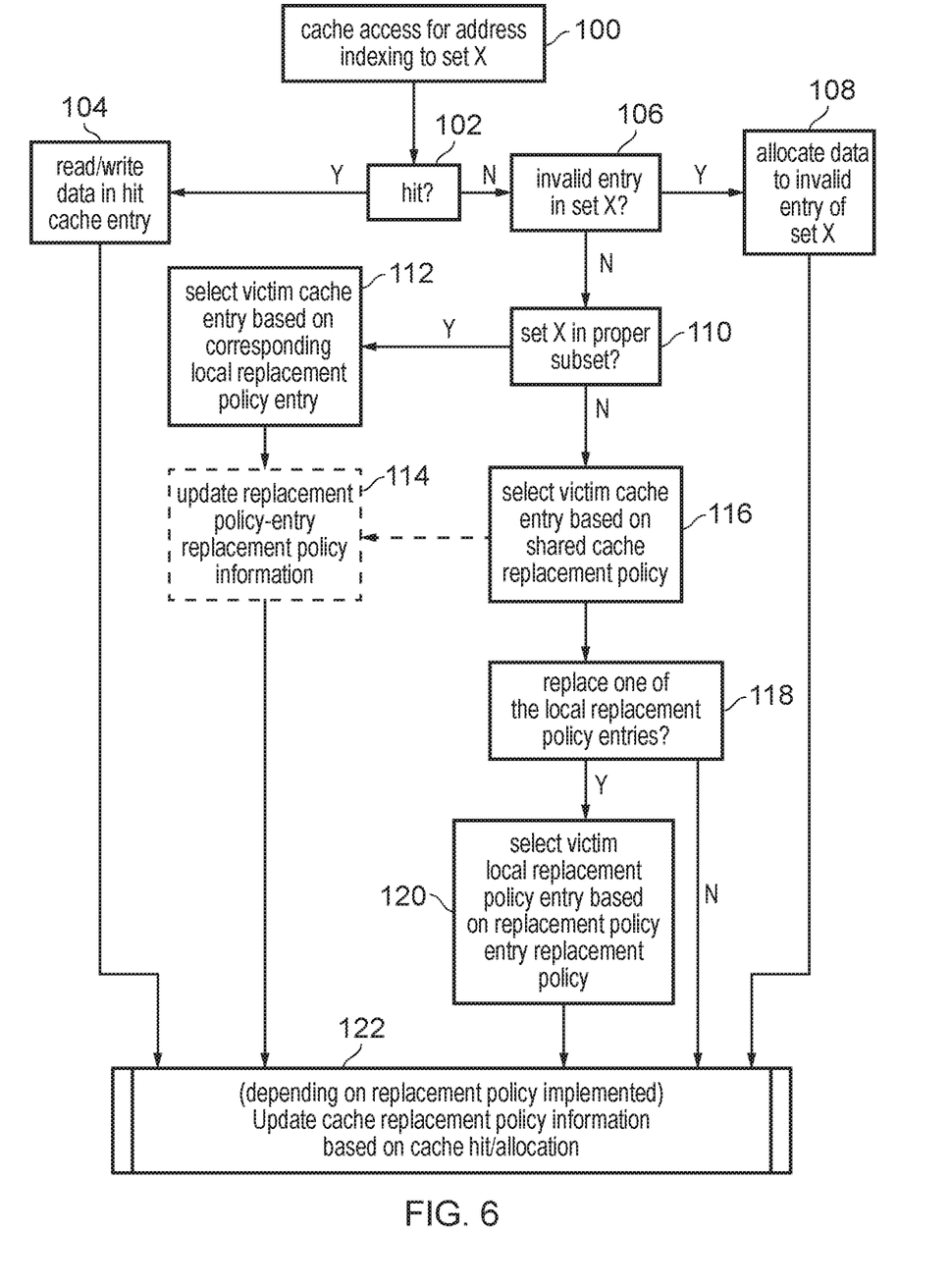
FIG. 6 is a flow diagram showing a method of controlling access to a set-associative cache.

FIG. 6 is a flow diagram showing a method for controlling access to the cache 8, 30, 32, 38. At step 100 the load-store unit 28 or the MMU 36 or the instruction fetch stage 6 requests a cache access for an address which indexes into a given set X of the cache. The cache control circuitry performs a cache lookup based on the target address 54. The cache control circuitry 70 selects the corresponding set X, reads out the tag 56 and data 58 in each of the indexed set 50 of entries 52, and compares the tags 56 with a tag portion of the target address 54 to determine whether there is a cache hit (when one of the tags matches the tag portion of the target address 54) or a cache miss (when none of the tags match the tag portion of the target address 54). At step 102, the cache control circuitry determines whether there was a cache hit or miss, and if there was a hit then at step 104 the data (which could be numeric data, instructions or page table entries) in the hit cache entry 52 is read or written.

On the other hand, if there was a cache miss, then at step 106 the cache control circuitry 17 determines whether one of the indexed sets X of entries is invalid and if so at step 108 the data associated with the specified target address is allocated to an invalid entry of step X.

If there was no invalid entry in set X for which the cache miss occurs, then at step 110 the cache control circuitry 17 determines whether set X is one of the proper subset of sets 50 for which a dedicated local replacement policy entry 64 is present in the replacement policy storage 62. This is determined by checking the tag portions 68 of the local replacement policy entries 64 to determine whether any of these tag portions 68 identifies set X. If set X is one of the proper subset of sets, then at step 112 a victim cache entry is selected from set X based on the information in the corresponding local replacement policy entry 112. For example, round robin, NRU or LRU tracking information may be used to determine which way 0, 1, 2, 3 of set X should be selected as the victim cache entry.

Depending on the particular replacement-policy-entry replacement policy used by the cache control circuitry 70 to manage the local replacement policy storage 64, optionally the cache control circuitry 17 may also update replacement-policy-entry replacement policy information 72 at step 114. For example, tracking information for an LRU or an NRU replacement policy could be updated. Note that in the RPE replacement policy information 72, the policy information indicates information for determining which set should be selected next for having its local replacement policy information evicted from the cache replacement policy storage 60, as opposed to the local replacement policy entries 64 themselves which provide information for determining which entry 52 of the corresponding set 50 of the primary cache 8, 30, 32, 38 should have its data evicted next.

In other examples, the RPE replacement policy information could be a metric which tracks cache thrashing, e.g. a counter which counts the number of misses within a given time period. In this case, the update of the RPE replacement policy information at step 114 could be an increment of the counter for a given set.

If at step 110 the given set X was not in the proper subset of entries then at step 116 the victim cache entry is selected instead based on the shared cache replacement policy 60. This could be based on a random or pseudo random number or on stored policy information, such as a round robin, NRU, or LRU tracking indicator. As the set X missed in the local replacement policy storage entry 64, it is possible (depending on the replacement policy entry replacement policy information) to allocate a new local replacement policy entry 64 for set X. At step 118 a decision is made whether to replace one of the local replacement policy entries 64 already allocated. It is not essential to make a replacement of a local replacement policy entry 64 on every miss in the local replacement policy storage, as to allow the replacement policy to remain stored for long enough to allow it to provide ongoing tracking of access/allocation for a given set, it may be preferred to protect local replacement policy entries against eviction for at least a certain minimum period, or to use a replacement policy which requires detection of cache thrashing in the primary cache as the trigger for making a replacement in the local replacement policy storage. Hence, for some instances of misses in the local replacement policy storage structure, step 120 of replacing a local replacement policy entry can be omitted.

However, on other occasions it may be determined to make a replacement in the local replacement policy storage and if so then at step 120 a victim local replacement policy entry 64 is selected based on the replacement policy entry (RPE) replacement policy being used, which could be based on the stored RPE replacement policy information 72 as discussed above.

Also, as shown in the dotted line between steps 116 and 114 of FIG. 6, on some occasions it may also be desirable to update the RPE replacement policy information 72 on a cache miss when set X is one of the remaining subset of sets 50 which does not have a dedicated local replacement policy entry 64. This allows the frequency of cache misses in set X and/or the recency of accesses/allocations to be tracked for set X, to allow a comparison with other parameters for other sets, to allow the cache control circuitry 70 to decide when to replace one of the local replacement policy entries 64 for another set with a local replacement policy entry 64 for set X. Hence, it will be appreciated that the RPE replacement policy information 72 may include information for a greater number of sets than the local replacement policy storage itself, as the RPE replacement policy information 72 may also need to track information about the remaining subset of sets, to allow a more informed decision of which sets should have a dedicated local replacement policy entry 64 allocated.

Regardless of whether there was a cache hit or cache miss, and regardless of whether set X was in the proper subset or not, it is possible at step 122 to update some cache replacement policy information based on the cache hit or the allocation that was made into the cache. It is also possible to update the cache replacement policy when there is an allocation of data to an invalid entry at step 108. For some cache replacement policies, the update could be performed only when there was an allocation on a cache miss, but may not be needed on a cache hit. For other replacement policies updates may also be performed on a cache hit.

Figure 7:
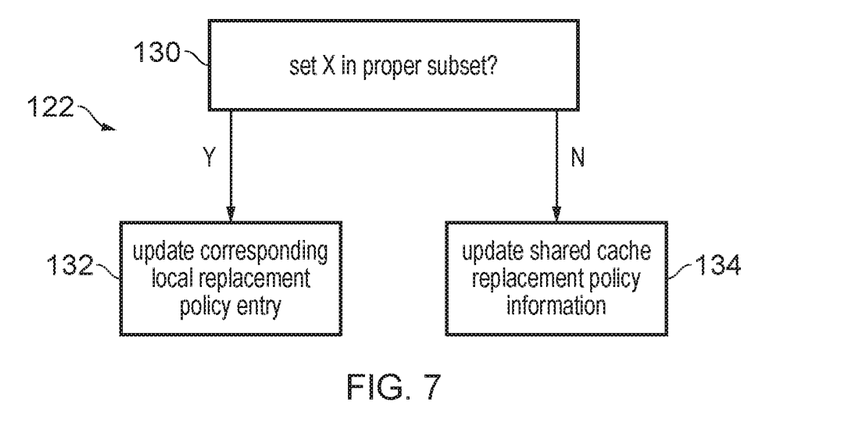
FIG. 7 is a flow diagram showing a method for updating replacement policy information following a cache hit or an allocation into the cache.

FIG. 7 shows in more detail the update of cache replacement policy information performed at step 122. At step 130 the cache control circuitry determines whether the set X which was accessed to trigger the update of cache replacement policy information is in the proper subset which has a specific local replacement policy entry 64 allocated for it within the replacement policy information storage 62. Note that after step 120 of FIG. 6, which steps are in the proper subset may have changed since the lookup was performed at step 110.

If the indexed set X is in the proper subset, then at step 132 the control circuitry determines to update the corresponding local replacement policy entry 64 whose tag 68 corresponds to set X. If set X is not in the proper subset but is instead one of the remaining subsets of sets 50 of the cache, then at step 134 the shared cache replacement policy information (if provided at all) may be updated. The local and shared cache replacement policies could in some examples be the same type of replacement policy (e.g. both LRU, or both NRU, or both round robin), except that for the local replacement policy, the stored local replacement policy entry 64 may be updated only in response to accesses or allocations for the corresponding set 50 of entries 52, while for the shared replacement policy, the stored shared replacement policy information 60 may be updated in response to accesses or allocations to any of the remaining subset of sets 50 of entries 52.

Hence, in summary a full local cache replacement policy is retained only for a smaller subset of sets 50 of the cache, to save circuit area compared to using a full local replacement policy and allow higher performance compared to using a fully shared replacement policy. Surprisingly, on some software workloads the partial local replacement policy can achieve much of a performance benefit of a full local replacement policy, as in any case not all of the sets may experience cache thrashing.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
a set-associative cache comprising a plurality of sets of cache entries;
cache replacement policy storage circuitry to store a plurality of local replacement policy entries, each local replacement policy entry comprising local replacement policy information specific to a corresponding set of the set-associative cache; and
cache control circuitry to control replacement of cache entries of the set-associative cache based on the local replacement policy information stored in the cache replacement policy storage circuitry; in which:
the cache replacement policy storage circuitry is configured to store local replacement policy entries for a proper subset of sets of the set-associative cache.

2. The apparatus according to claim 1, in which in response to a cache miss in a given set of the set-associative cache, when allocation of data to the given set requires a victim cache entry of the given set to be evicted, the cache control circuitry is configured to:
determine whether the given set is one of said proper subset of sets; and
when the given set is one of said proper subset of sets, to select the victim cache entry based on the local replacement policy information in a corresponding local replacement policy entry of the cache replacement policy storage circuitry.

3. The apparatus according to claim 2, in which when the given set is one of a remaining subset of sets of the set-associative cache other than said proper subset, the cache control circuitry is configured to select the victim cache entry based on a shared cache replacement policy shared between the remaining subset of sets.

4. The apparatus according to claim 3, in which the shared cache replacement policy comprises a random replacement policy.

5. The apparatus according to claim 3, in which for the shared cache replacement policy, the cache control circuitry is configured to select the victim cache entry based on shared replacement policy information stored in the cache replacement policy storage circuitry.

6. The apparatus according to claim 1, in which in response to a cache hit or allocation of a new entry in a given set of the set-associative cache, when the given set is one of said proper subset of sets, the cache control circuitry is configured to update the local replacement policy information in a corresponding local replacement policy entry of the replacement policy storage circuitry.

7. The apparatus according to claim 5, in which in response to a cache hit or allocation of a new entry in a given set of the set-associative cache, when the given set is one of said remaining subset of sets, the cache control circuitry is configured to update the shared cache replacement policy information.

8. The apparatus according to claim 3, in which the shared cache replacement policy comprises one of: a round robin replacement policy, a least recently used replacement policy and a not-recently-used replacement policy.

9. The apparatus according to claim 1, in which the cache control circuitry is configured to vary which sets of the set-associative cache are in said proper subset of sets.

10. The apparatus according to claim 1, in which the cache control circuitry is configured to control allocation of sets to the plurality of local replacement policy entries based on a set-associative or fully-associative placement policy.

11. The apparatus according to claim 1, in which the cache control circuitry is configured to control, based on a replacement-policy-entry replacement policy, selection of a victim local replacement policy entry to be overwritten with replacement policy information for a different set.

12. The apparatus according to claim 11, in which the replacement-policy-entry replacement policy comprises a random replacement policy.

13. The apparatus according to claim 11, in which the replacement-policy-entry replacement policy is based on replacement-policy-entry replacement policy information.

14. The apparatus according to claim 11, in which the replacement-policy-entry replacement policy is one of: a round robin replacement policy, a least recently used replacement policy and a not-recently-used replacement policy.

15. The apparatus according to claim 1, in which each local replacement policy entry comprises a tag portion identifying the corresponding set of the set-associative cache.

16. The apparatus according to claim 1, in which the local replacement policy information comprises information associated with one of: a round robin replacement policy, a least recently used replacement policy and a not-recently-used replacement policy.

17. An apparatus comprising:
means for set-associative caching, comprising a plurality of sets of cache entries;
means for storing a plurality of local replacement policy entries, each local replacement policy entry comprising local replacement policy information specific to a corresponding set of the means for set-associative caching; and
means for controlling replacement of cache entries of the means for set-associative caching based on the local replacement policy information stored in the means for storing; in which:
the means for storing is configured to store local replacement policy entries for a proper subset of sets of the means for set-associative caching.

18. A method comprising:
storing data in a set-associative cache comprising a plurality of sets of cache entries; and
controlling replacement of cache entries of the set-associative cache based on local replacement policy information stored in cache replacement policy storage circuitry configured to store a plurality of local replacement policy entries, each local replacement policy entry comprising local replacement policy information specific to a corresponding set of the set-associative cache; in which:
the cache replacement policy storage circuitry is configured to store local replacement policy entries for a proper subset of sets of the set-associative cache.

* * * * *